(12) United States Patent
Copeland

(10) Patent No.: US 7,284,356 B2
(45) Date of Patent: Oct. 23, 2007

(54) WOUND-IN TENON FOR ATTACHMENT OF LUMINAIRE

(75) Inventor: S. Douglas Copeland, Columbia, SC (US)

(73) Assignee: Genlyte Thomas Group, LLC, Louisville, KY (US)

( * ) Notice: Subject to any disclaimer, the term of this patent is extended or adjusted under 35 U.S.C. 154(b) by 119 days.

(21) Appl. No.: 11/220,259

(22) Filed: Sep. 6, 2005

(65) Prior Publication Data

US 2007/0053192 A1    Mar. 8, 2007

(51) Int. Cl.
*E04C 3/30* (2006.01)

(52) U.S. Cl. .................................... 52/726.4

(58) Field of Classification Search ................ 362/410, 362/414, 415, 431, 153.1; 52/726.4, 736.4
See application file for complete search history.

(56) References Cited

U.S. PATENT DOCUMENTS

| | | | |
|---|---|---|---|
| 3,015,720 A | 1/1962 | Silverman | |
| 3,200,554 A | 8/1965 | Goodman et al. | |
| 4,002,714 A | 1/1977 | Usui | |
| 4,003,776 A | 1/1977 | Barnes | |
| 4,289,557 A | 9/1981 | Stanwood et al. | |
| 4,405,398 A | 9/1983 | Rother et al. | |
| 5,266,738 A * | 11/1993 | MacVoy | 174/45 R |
| 5,401,345 A | 3/1995 | Park | |
| 5,556,673 A * | 9/1996 | Giraud | 428/34.4 |
| 6,575,605 B2 | 6/2003 | Averbeck et al. | |
| 6,955,024 B2 * | 10/2005 | Ashton | 52/736.1 |
| 7,090,382 B2 * | 8/2006 | Haddad et al. | 362/431 |
| 2002/0118546 A1 | 8/2002 | Averbeck et al. | |
| 2003/0196393 A1 | 10/2003 | Bowman et al. | |
| 2004/0070985 A1 | 4/2004 | Haddad et al. | |
| 2004/0165394 A1 | 8/2004 | Pusch | |

* cited by examiner

*Primary Examiner*—John Anthony Ward
(74) *Attorney, Agent, or Firm*—Chad D. Bruggeman; Middleton Reutlinger

(57) ABSTRACT

A modular pole system for a luminaire includes an elongated pole section formed from a continuous filament winding process with a tenon wound into a tip end of the pole section. A method for making a modular pole system includes placing a tenon over a trunion end of a mandrel and winding a pre-selected thickness of a filament along the length of the mandrel up to and including a pre-selected length of the tenon to produce a tenon wound into a pole section of the modular pole system.

18 Claims, 4 Drawing Sheets

WOUND-IN TENON FOR ATTACHMENT OF LUMINAIRE

BACKGROUND OF THE INVENTION

1. Field of the Invention

The present invention relates to a modular pole system for receipt and support of a luminaire. More particularly, the present invention relates to a modular pole system which includes a wound-in tenon formed from a continuous filament winding process for support of a luminaire thereon.

2. Prior Art

Full length lighting systems usually include an elongated cast iron or other metalized products in pole shape with a tenon placed or attached to the upper end of the elongated pole for receipt of a luminaire or lighting fixture thereon. These full length lighting systems are generally used outdoors where they are either mounted onto concrete bases or embedded into the earth with the lighting fixture attached to the upper end thereof. In the construction of these full length lighting systems, the metal poles receive one end of a tenon in the upper end of the pole and the tenon is provided with an upper portion specifically designed for the attachment of a lighting fixture thereon. The generally accepted method of attaching a luminaire to a pole is to bond a steel sleeve (tenon) of a pre-selected inside diameter over the pole, and then fit the luminaire over the outside of the sleeve.

The luminaire is generally attached with set screws.

SUMMARY OF THE INVENTION

It an object of the present invention to provide a modular pole system for receipt of a luminaire or lighting fixture thereon.

Another object of the invention is to provide a modular pole system for a luminaire which includes an elongated pole section formed from a continuous filament winding process.

It is also an object of the present invention to provide a fiberglass pole having a tenon wound directly into the tip end of the pole and held in place with continuous glass reinforcement.

It is even a further object of the present invention to prepare a modular pole system which is an electrical insulator and also has improved impact resistance.

More particularly, the present invention relates to a modular pole system for a luminaire which includes an elongated pole section formed from a continuous filament winding process with a tenon wound into a first or upper end of the pole section.

Even more particularly, the present invention is directed to a method of manufacturing a modular pole system wherein a tenon is placed over a trunion end of a mandrel and a pre-selected thickness of a filament is wound along the length of the mandrel up to and including a pre-selected length of the tenon to produce a tenon wound into a pole section of the wound-in filament.

Other objects and advantages of the present invention will appear from the following description and appended claims, reference being had to the accompanying drawings forming a part of the specification wherein like reference characters designate corresponding parts into several views.

DESCRIPTION OF THE PREFERRED EMBODIMENTS

Figure 1:
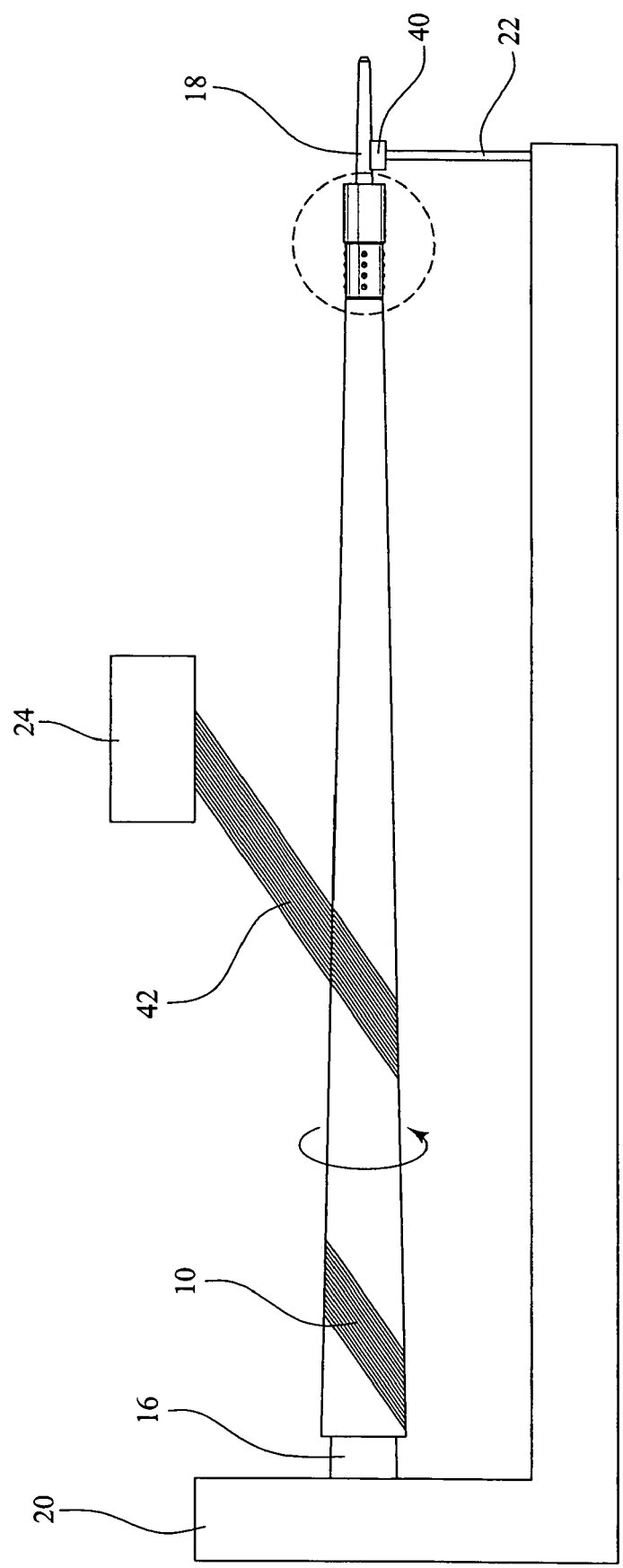
FIG. 1 is a schematic construction of a fibrous filament winding apparatus showing the manufacturing of a wound-in tenon of the present invention.

FIG. 1 illustrates one preferred method for manufacturing a modular pole system of the present invention. As shown, a mandrel 16 having a trunion 18 at one end thereof, is supported by a vertically extending support 20 at an opposed end through which the rotating mandrel 16 is mounted. The mandrel 16 is rotated by appropriate winder motors and controls (not shown) well known in the art. The one end of the mandrel 16 includes a trunion 18 which fits within a vertically moveable support 22 which includes rollers 40 upon which the trunion 18 is received. The vertically moveable support 22 includes appropriate prior art means for moving the rollers up and down which enables the removal of a continuous filament pole, identified by the numeral 10, upon completion of winding a tenon 12 (FIGS. 2, 2A) therein.

In the manufacturing of a modular pole system of the present invention, as illustrated in FIG. 1, a mandrel 16 includes a trunion 18 at one end, the trunion 18 being integral with the mandrel 16. The mandrel 16 is rotated at a pre-selected rate and receives filaments 42 from a longitudinally moveable carriage 24 which is disposed above the rotating mandrel 16. Preferrably, filament 42 are fiberglass or other filaments with electrical insulating properties used in the manufacturing of a continuous filament pole 10. The mandrel 16 is rotated at a pre-selected speed and the carriage 24 moves longitudinally along the mandrel 16 from a selected location adjacent the support 20 to a pre-selected position adjacent to the vertically moveable support 22.

Figure 2A:
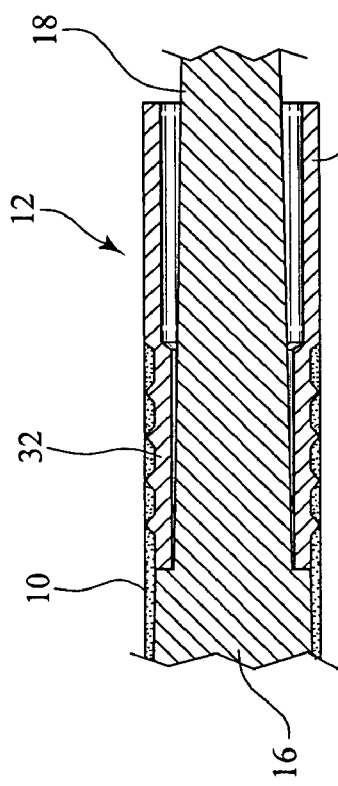
FIG. 2A is a sectional view showing a tenon on a trunion after being wound into a continuous filament wound pole.
Figure 2:
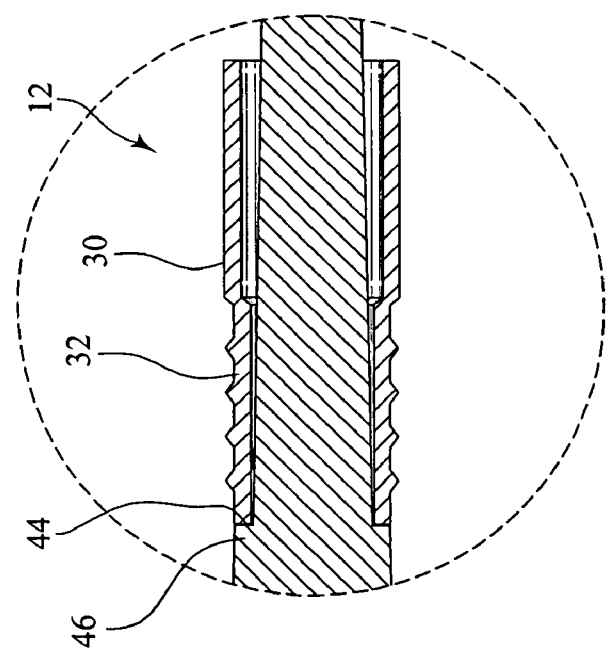
FIG. 2 is a sectional view of a tenon over a trunion end of a mandrel prior to winding the tenon into a continuous filament wound pole.

With continued reference to FIG. 1, tenon 12 (FIG. 2) is placed onto a trunion 18 when the vertically moveable support 22 is in a lowered position. The vertically moveable support 22 is then moved into a raised position which is in horizontal alignment with the mandrel 16 at its mounting position within the vertical support system 20. The tenon 12, as best shown in FIG. 2, has an inside diameter approximately the same as the outside diameter of the trunion 18 and the tenon 12 has a trunion receiving or first end 30, and a second end 32 which abuts a terminating end 44 of the mandrel 16. The outer diameter of the first end 30 is of a pre-selected diameter substantially the same as the terminating end diameter of the fiberglass pole 10. The outside diameter of the second end 32 is substantially the same as the terminating end 44 of the mandrel 16. In the manufacturing of the fiberglass pole 10 including the wound-in tenon 12, the mandrel 16 is rotated at a pre-selected speed to receive the fiberglass filament 42 from a longitudinally moveable carriage 24. The carriage 24 moves reciprocally along the mandrel at a predetermined linear speed thereby building the pole 10 into a plurality of filament layers thick. In a preferred embodiment, the mandrel 16, which is usually from about 4 to 5 inches in diameter, is tapered toward the trunion end 18 at a pre-selected constant taper usually from about 0.12 inches per foot to about 0.16 inches per foot. The terminating end of the mandrel portion will usually be about 2.2 to 2.4 inches in diameter and the trunion will be generally from about 1.8 to about 2.2 inches in diameter thereby providing a shoulder 46 at the junction of the mandrel 16 and the trunion 18 to which the tenon 12 abuts. Thus, the tenon 12 will generally have a first section 30 of an outside diameter of between 2.9 and 3.1 inches and an outside diameter of a second section 32 from about 2.5 to 2.7 inches. The outside diameter of the second section 32 is approximately the same as the tip end 44 of the mandrel 16. Thus, the thickness of the fiberglass will be of a continuous taper from about 0.125 to 0.250 inches. The inside diameter of the tenon 12 is substantially the same along the entire longitudinal length through the first section 30 and the second section 32 and is of a pre-selected diameter to fit on the trunion 18 as best shown in FIGS. 2, 2A.

Generally, prior to winding the filament 42 to the mandrel 16 a mold release agent is sprayed along the entire length of the mandrel 16 so that the release of the fiberglass pole 10 is easily accomplished upon completion of the manufacturer of the pole 10. Upon completion of the winding of the filaments 42 around the mandrel 16, the vertically moveable support 22 is lowered and the rollers 40 disengage from the trunion 18 in a lowered position The fiberglass pole 10 is then pushed, by any means known in the art, off of the mandrel 16.

Figure 3:
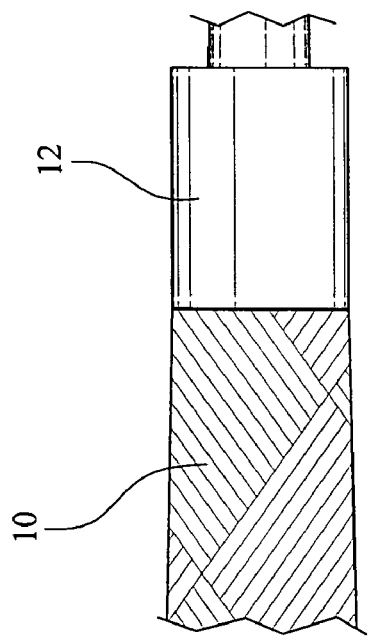
FIG. 3 is a side-view of a tip end of a fibrous pole with a tenon wound into the pole.

In FIG. 2 is shown a tenon 12 mounted onto a trunion 18 and is in an abutting relationship with a mandrel 16. The tenon's second end 32 abuts with the shoulder 46 of the tip end 44 of the mandrel 16. As shown in FIG. 2, the tenon 12 is in place on the trunion 18 prior to winding. As shown in FIG. 2A and FIG. 3, the tenon 12 is wound into the fiberglass pole 10, the fiberglass circumscribing the second end 32 of the tenon 12.

Figure 4:
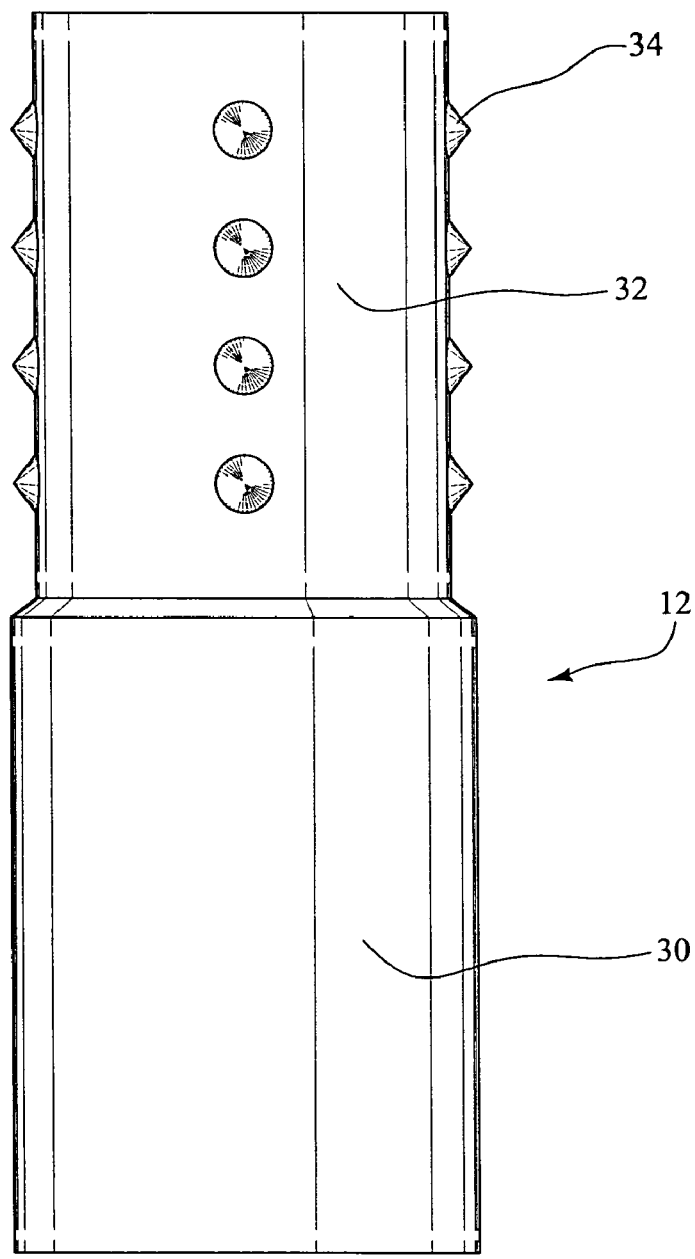
FIG. 4 is a side-view of a preferred tenon for use in the present invention.

In FIG. 4 is shown a preferred tenon 12 for winding into a fiberglass pole 10 (FIG. 5) wherein the tenon 12 includes a first end 30 and a second end 32 with projections 34 extending along the outer surface of the second end 32 for securing the fiberglass filaments to the second end 32 upon the winding in of the fiberglass pole 10 to the tenon 12. With these projections 34, the tenon being wound directly into the tip end of the pole 10, the tenon is held in place with the projections 34 engaging with the continuous glass reinforcement.

Tenon 12 used in the present invention may be made from metallic materials as well as thermo-plastics such as polybutylene, polyethylene terephthalate, polyamides, glass filled polyamides, and the like. The continuous filament pole 10 may be made from, preferably, fiberglass, epoxy resins or any other fibrous plastic material as well as spun metallic materials which have good insulating properties.

Figure 5:
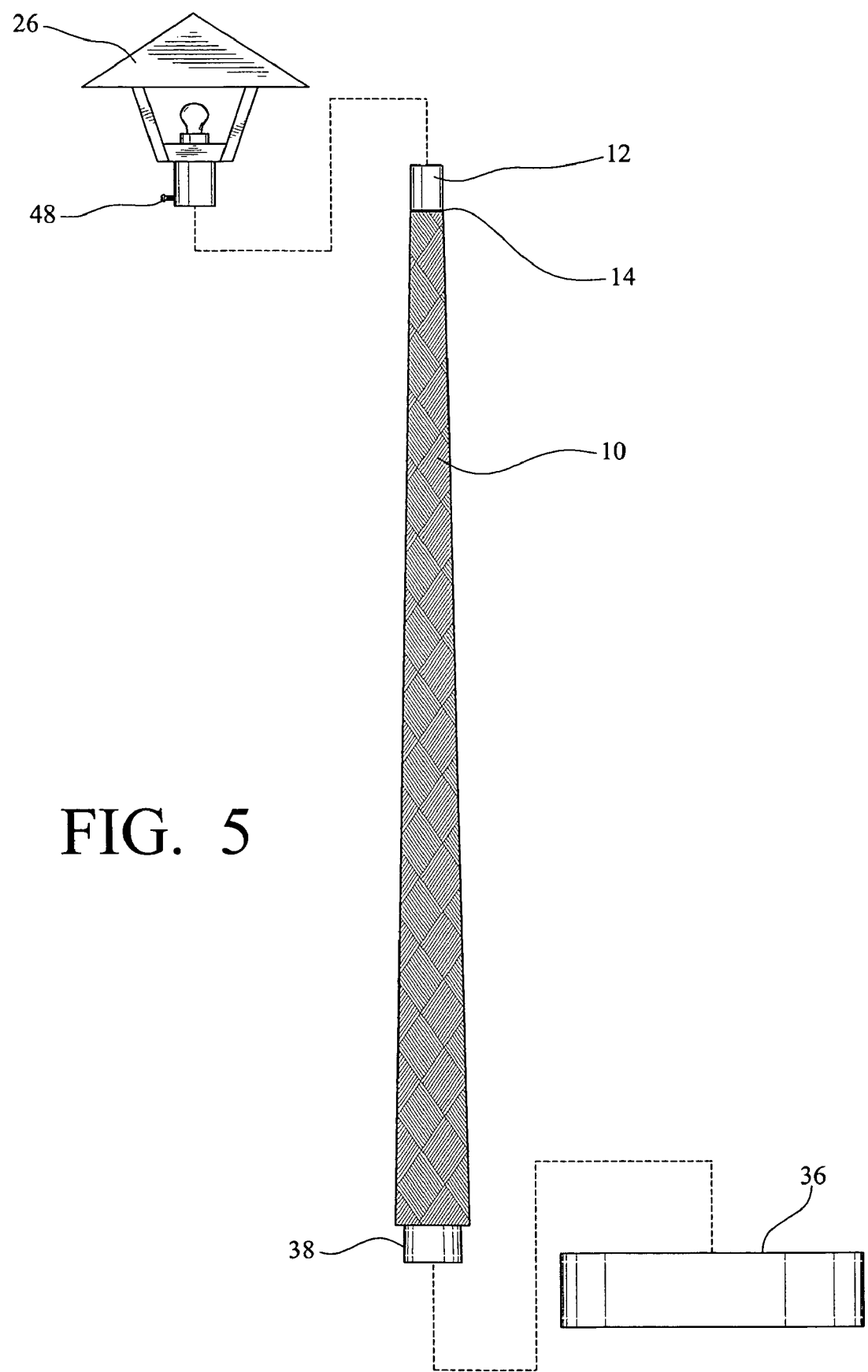
FIG. 5 is an exploded view of a modular pole system of the present invention showing the attachment of a luminaire over a tenon.

As illustrated in FIG. 5, a completed continuous fibrous pole 10 includes a base mounting end 38 for receipt into a support 36 which may be concrete, the earth or the like or any other prior art bases upon which an elongated pole may be mounted. A luminaire, identified by the numeral 26, is mountable onto the tenon 12 usually by fitting over the tenon 12 and held in place with set screws 48.

The detailed description is given primarily for clearness of understanding and no unnecessary limitations are to be understood therefrom for modifications will become obvious to those skilled in the art upon reading this disclosure and may be made without departing from the spirit of the invention and scope of the appended claims.

What is claimed is:

1. A modular pole system for a luminaire comprising:
an elongated pole section formed of a continuous filament from a continuous filament winding process; and,
a tenon integrally wound into a first end of said pole section by said continuous filament.

2. The modular pole system of claim 1, said tenon having a first end and a second end, said first end having an outside diameter greater than said second end, said second end of said tenon being wound into said first end of said pole section by said continuous filament.

3. The modular pole system of claim 2, said tenon second end having protrusions on an outer surface for engagement with said continuous filament of said pole section.

4. The modular pole system of claim 1, said pole section first end having an outside diameter approximately the same as an outside diameter of said tenon first end, said pole section first end terminating at the juncture of said tenon first end and said tenon second end.

5. The modular pole system of claim 1, said pole section being fiberglass.

6. The modular pole system of claim 1, said pole section being tapered from an opposed second end to said first end.

7. The modular pole system of claim 6, said taper being from about 0.12" per linear foot to about 0.16" per linear foot.

8. A method of manufacturing a modular pole system comprising the steps of:
A. placing a tenon over a trunion end of a mandrel;
B. winding a pre-selected thickness of filament along the length of said mandrel to form a first end of a pole section and up to and including a pre-selected length of said tenon to result in said tenon being integrally wound into said first end of said pole section; and,
C. removing said resulting tenon and pole section from said mandrel, said resulting tenon and pole section forming a modular pole system.

9. The method of claim 8, said pre-selected thickness of said filament in combination with the outside diameter of said tenon at the junction with said first end of said pole being approximately the same as an outside diameter of an exposed surface of said tenon.

10. The method of claim 9, said pre-selected thickness of filament being tapered from a second end of said mandrel opposite a first end at said trunion, said thickness being greater at said second end than at said first end of said mandrel.

11. The method of claim 10, said pre-selected thickness taper being from about 0.1" per linear foot to about 0.16" per linear foot.

12. The method of claim 8, said filament being fiberglass.

13. The method of claim 8, including a step of applying a mold release composition to said mandrel prior to winding said filament thereon.

14. The method of claim 8, said mandrel being tapered from a second end to an opposed trunion end, said second end having a greater outside diameter than said trunion end.

15. The method of claim 14, said taper being from about 0.12" per linear foot to about 0.16" per linear foot of said mandrel.

16. An integral tenon and continuous filament pole, comprising:

a tenon having a first and a second end, said second end integrated with the pole by means of the windings of continuous filament forming said continuous filament pole, said second end having a plurality of outwardly extending projections to secure said windings of continuous filament, said first end adapted to receive a luminaire.

17. The filament pole of claim 16 wherein said tenon first end has an external diameter greater than an external diameter of said second end.

18. The filament pole of claim 16 wherein said tenon first end has an external diameter about equal to the total external diameter of said tenon second end and said windings of continuous filament when integrated with said pole by said continuous filament.

* * * * *